(12) United States Patent
Lu et al.

(10) Patent No.: US 9,358,647 B2
(45) Date of Patent: Jun. 7, 2016

(54) SCREW LOCKING DEVICE

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventors: Jin-Hua Lu, Jiashan (CN); Da-Zhuang Xu, Jiashan (CN); Xue-Bing Wang, Jiashan (CN)

(73) Assignees: FU DING ELECTRONICAL TECHNOLOGY (JIASHAN) CO., LTD, Zhejiang (CN); HON HAI PRECISION INDUSTRY CO., LTD., New Taipei (TW)

(*) Notice: Subject to any disclaimer, the term of this patent is extended or adjusted under 35 U.S.C. 154(b) by 393 days.

(21) Appl. No.: 14/079,772

(22) Filed: Nov. 14, 2013

(65) Prior Publication Data

US 2014/0137706 A1    May 22, 2014

(30) Foreign Application Priority Data

Nov. 19, 2012 (CN) ...................... 2012 2 0612038 U

(51) Int. Cl.
*B23P 19/06* (2006.01)
*B23P 19/00* (2006.01)

(52) U.S. Cl.
CPC ............... *B23P 19/06* (2013.01); *B23P 19/001* (2013.01); *Y10S 901/02* (2013.01); *Y10S 901/41* (2013.01)

(58) Field of Classification Search
CPC ...... B23P 19/06; B23P 19/001; Y10S 901/41; Y10S 901/02
See application file for complete search history.

(56) References Cited

U.S. PATENT DOCUMENTS

| | | | | |
|---|---|---|---|---|
| 3,577,624 A * | 5/1971 | Bentschneider | ...... | B23P 19/006 29/240.5 |
| 9,051,133 B2 * | 6/2015 | Kremser | ................ | B65G 51/02 406/85 |
| 9,067,285 B2 * | 6/2015 | Ota | ........................ | B23P 19/006 81/430 |
| 9,079,275 B2 * | 7/2015 | Ota | ........................ | B23P 19/005 29/809 |
| 9,085,055 B2 * | 7/2015 | Sugimoto | ............... | B25B 23/04 81/430 |
| 2010/0180424 A1 * | 7/2010 | Le Vacon | ................ | B21J 15/022 29/505 |
| 2011/0113623 A1 * | 5/2011 | Tomchick | .............. | B21D 43/00 29/809 |

* cited by examiner

*Primary Examiner* — David B Thomas
(74) *Attorney, Agent, or Firm* — Novak Druce Connolly Bove + Quigg LLP

(57) ABSTRACT

A screw locking device includes a feeding mechanism, a conveying mechanism, and a pneumatic screw driver. The conveying mechanism includes a base, a pneumatic driver slidably mounted on the base, a pair of blocking members slidably mounted on the base, a conveying bridge, a flexible tube, and a controller. Each blocking member includes a blocking end positioned below the pneumatic driver. The conveying bridge communicates with the feeding mechanism, and extends to the blocking ends. The flexible tube aligned with a gap between the blocking ends, and communicates with the pneumatic screw driver.

19 Claims, 5 Drawing Sheets

SCREW LOCKING DEVICE

BACKGROUND

1. Technical Field

The present disclosure relates to screw locking devices, particularly to an automatic screw locking device.

2. Description of Related Art

Screws are used to lock workpieces. An operator may use a screwdriver to manually drive and lock or fasten screws to a workpiece one by one, which has a low efficiency. Manually locking or fastening screws to the workpieces may contribute to a huge amount of dedicated manual labor and associated labor costs, and a lower efficiency, especially when the screws are very small. Furthermore, the workpieces may be easily damaged by the operator during the manually locking and fastening of screws.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
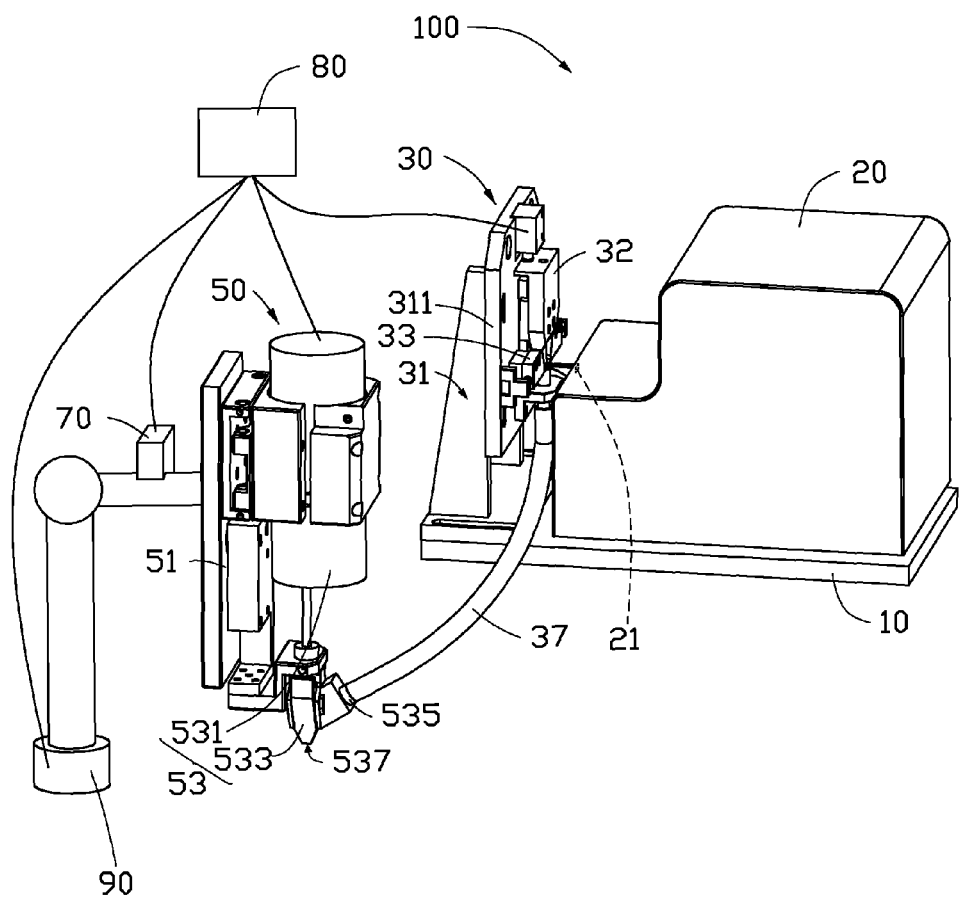
FIG. 1 is an isometric view of an embodiment of a screw locking device including a platform, a feeding mechanism, a conveying mechanism, and a screw locking mechanism.
Figure 2:
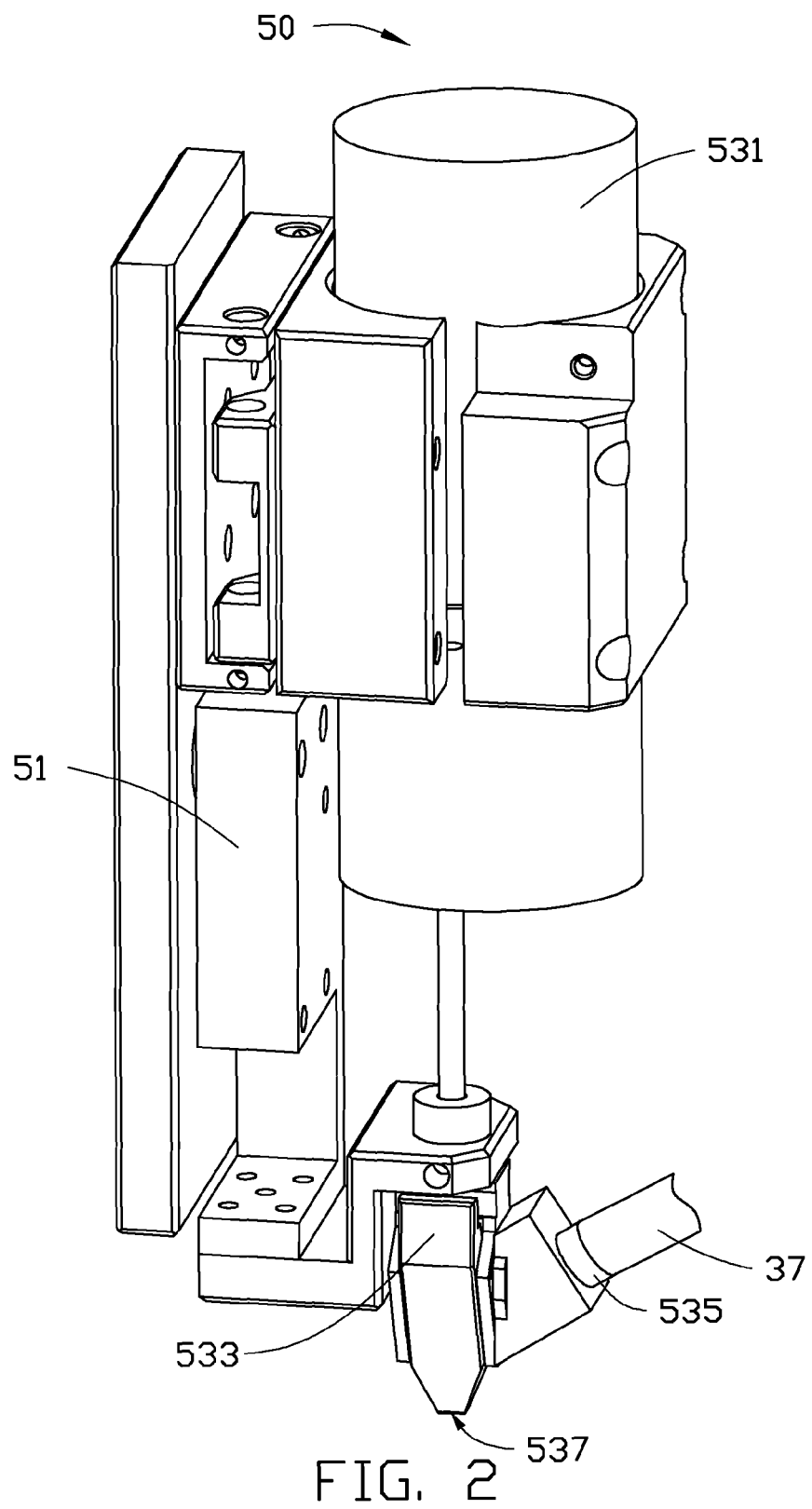
FIG. 2 is a partial, isometric view of the screw locking mechanism of the screw locking device shown in FIG. 1.

FIGS. 1 and 2 show one embodiment of a screw locking device 100. The screw locking device 100 includes a platform 10, a feeding mechanism 20, a conveying mechanism 30, a screw locking mechanism 50, a sensor 70, and a controller 80. The feeding mechanism 20 is mounted on the platform 10, and is connected to the conveying mechanism 30. The conveying mechanism 30 is connected to the screw locking mechanism 50. The sensor 70 is mounted on the screw locking mechanism 50, and is configured to sense a workpiece for locking with a plurality of screws 200 (shown in FIG. 5). The controller 80 is electrically connected to the conveying mechanism 30, the screw locking mechanism 50, and the sensor 70. When the controller 80 receives a signal emitted by the sensor 70, the controller 80 controls the conveying mechanism 30 to convey the screws 200 to the screw locking mechanism 50, and controls the screw locking mechanism 50 to lock the screws 200 to the workpiece.

In the illustrated embodiment, the feeding mechanism 20 is a vibrating screw feeding mechanism. The feeding mechanism 20 is positioned beside the platform 10, and defines a feeding opening 21 communicating with the conveying mechanism 30. The feeding mechanism 20 is configured to receive the screws 200, and feed the screws 200 via the feeding opening 21 to the conveying mechanism 30 one by one.

Figure 3:
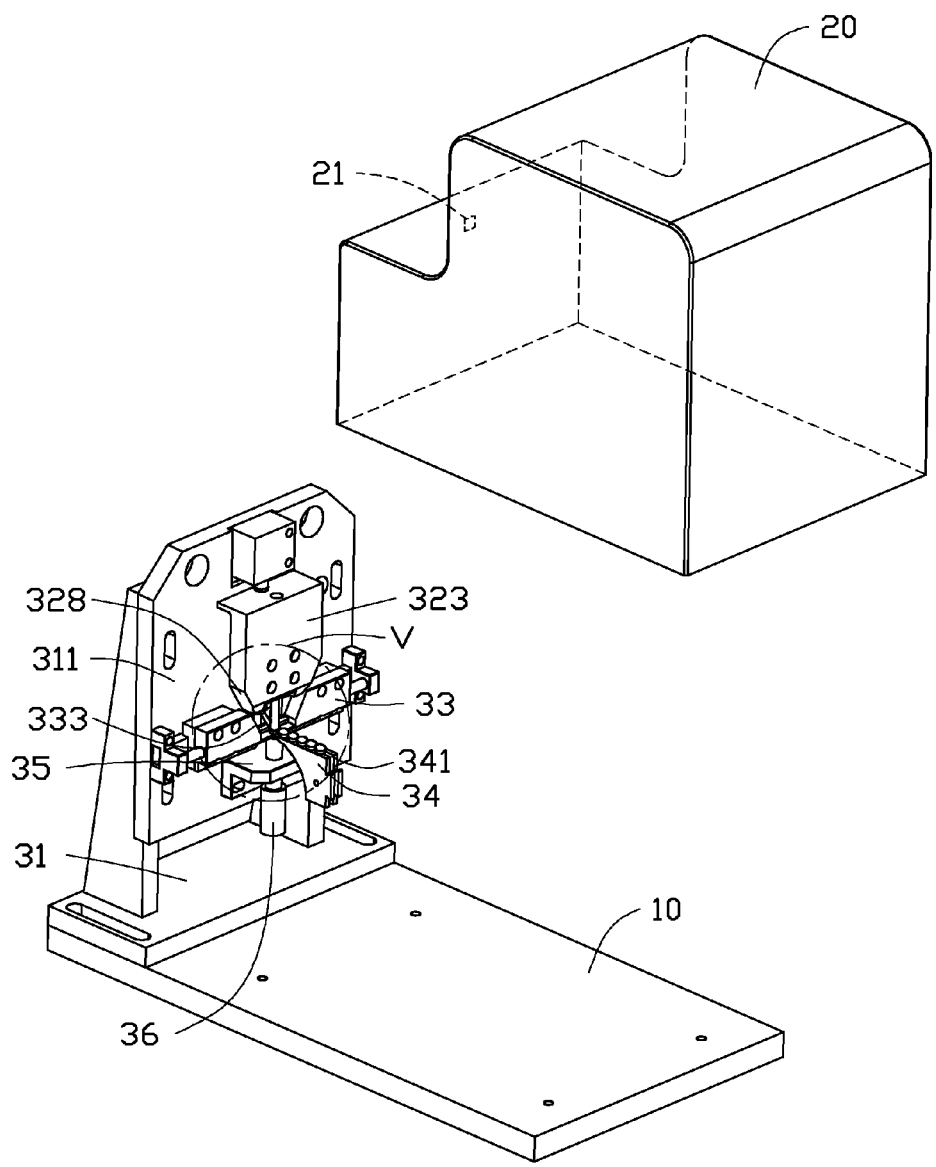
FIG. 3 is a partial, exploded view of the screw locking device shown in FIG. 1.
Figure 4:
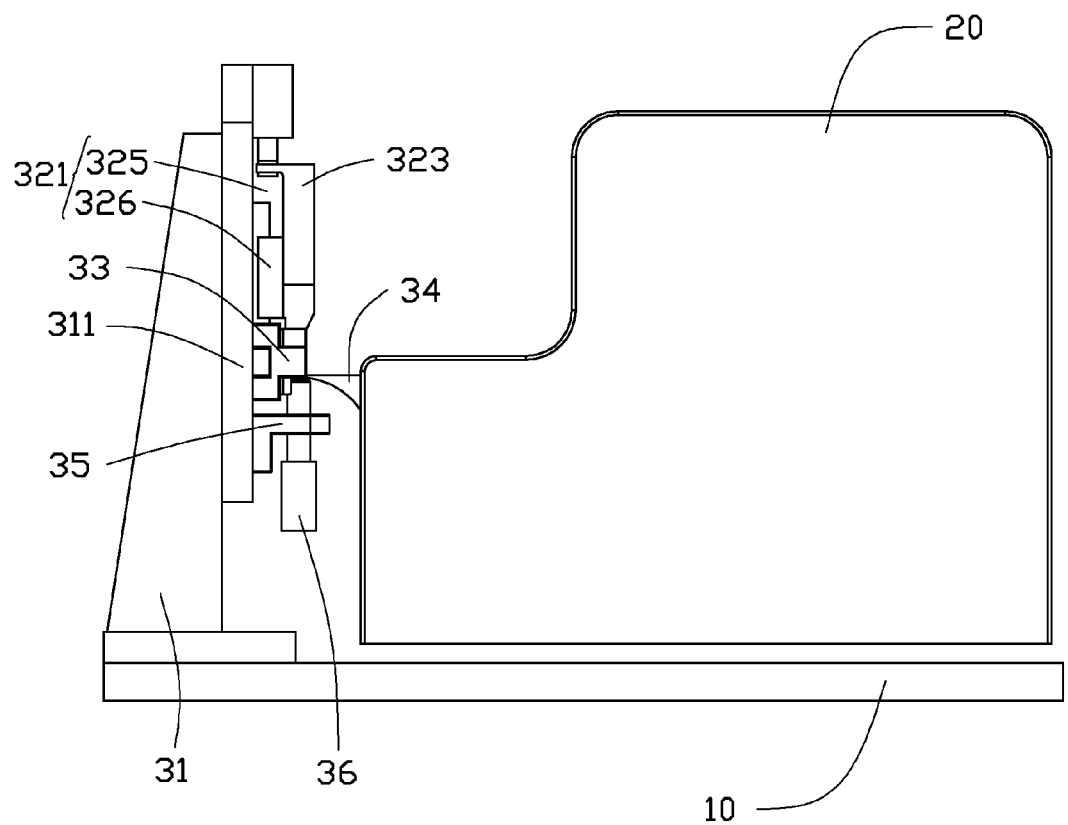
FIG. 4 is a side view of the platform, the feeding mechanism, the conveying mechanism of the screw locking device of the embodiment shown in FIG. 1.
Figure 5:
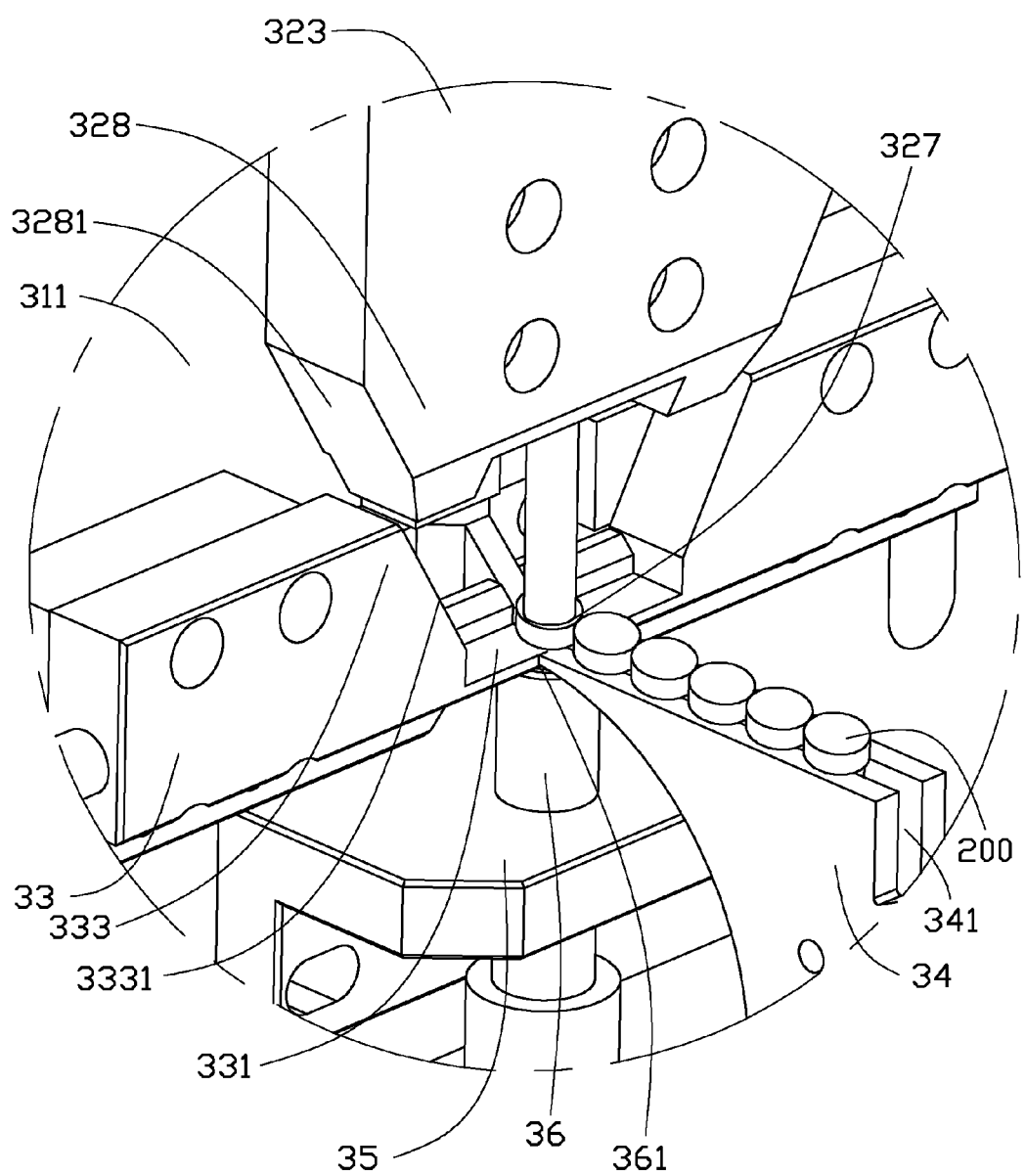
FIG. 5 is an enlarged, isometric view of a circled portion V in FIG. 3.

FIGS. 3 to 5 show the conveying mechanism 30 positioned on an end of the platform 10 opposite to the feeding mechanism 20, and faces the feeding opening 21. The conveying mechanism 30 includes a base 31, a driving assembly 32, a pair of blocking members 33, a conveying bridge 34, a fixing block 35, a conveying tube 36, and a flexible tube 37. The base 31 is positioned on the platform 10 and opposite to the feeding mechanism 20, and faces the feeding opening 21. The base 31 includes a mounting plate 311 perpendicularly mounted on the platform 10, for mounting the driving assembly 32, the blocking members 33, and the fixing block 35. The driving assembly 32 is mounted on the mounting plate 311, and is parallel to the mounting plate 311. The driving assembly 32 includes a guiding rail 321 and a pneumatic driver 323 mounted on the mounting plate 311 by the guiding rail 321. The guiding rail 321 includes a guiding member 325 mounted on the mounting plate 311 and perpendicular to the platform 10, and a sliding member 326 engaging with the guiding member 325. The pneumatic driver 323 is positioned on the sliding member 326, and is capable of sliding along the guiding member 325 together with the sliding member 326. The pneumatic driver 323 defines an air outlet 327 (shown in FIG. 5) at an end thereof adjacent to the platform 10. The pneumatic driver 323 is connected to an outside air source (not shown), and is capable of discharging air from the air outlet 327. A pair of resisting portions 328 is positioned at opposite sides of the pneumatic driver 323. The resisting portion 328 includes an inclined surface 3281 inclined towards the air outlet 327.

The pair of blocking members 33 is movably mounted on the mounting plate 311, and are arranged below the pneumatic driver 323 in an imaginary straight line. The blocking members 33 are symmetrically positioned relative to a center line of the pneumatic driver 323. Each blocking member 33 includes a blocking end 331 and a movable portion 333 connected to the blocking end 331. The blocking end 331 protrudes from the movable portion 333 towards the other blocking member 33, and is positioned adjacent to the air outlet 327. The blocking ends 331 of the pair of blocking members 33 are coplanar with each other, and positioned below the air outlet 327. The air outlet 327 is aligned with a gap between the blocking ends 331 of the pair of blocking members 33. Each movable portion 333 is located adjacent to the pneumatic driver 323, and corresponding to one of the resisting portions 328. The movable portion 333 includes an inclined surface 3331 corresponding to the inclined surface 3281 of the resisting portion 328. When the pneumatic driver 323 moves along the guiding rail 321 towards the platform 10, and thereby having the resisting portion 328 pushing the movable portion 333 and the inclined surface 3281 to move along the inclined surface 3331 of the movable portion 333, so that the pair of blocking members 33 moves away from each other. When the resisting portions 328 stop pushing the movable portions 333, the pair of blocking members 33 move towards each other, and the blocking ends 331 move towards each other. In the illustrated embodiment, both the pneumatic driver 323 and the blocking member 33 are cylinders.

The conveying bridge 34 is fixed to the feeding mechanism 20. An end of the conveying bridge 34 is positioned adjacent to the feeding opening 21, and an opposite end of the conveying bridge 34 is extended to resist the blocking ends 331. The conveying bridge 34 defines a conveying groove 341. An end of the conveying groove 341 communicates with the feeding opening 21, and an opposite end of the conveying groove 341 communicates with the gap between the blocking ends 331, so that the screws 200 feeding from the feeding opening 21 are conveyed along the conveying groove 341 to the blocking ends 331. In an alternative embodiment, the conveying bridge 34 can be positioned on the platform 10.

The fixing block 35 is mounted on the mounting plate 311, and is positioned below the pneumatic driver 323. The conveying tube 36 is positioned on the fixing block 35. The conveying tube 36 defines a through hole 361 (shown in FIG. 5). The through hole 361 is aligned with the air outlet 327 of the pneumatic driver 323. A size of the through hole 361 is substantially equal to a size of the screw 200. The flexible tube 37 interconnects the conveying tube 36 to the screw locking mechanism 50, for transporting the screws 200 from the conveying tube 36 to the screw locking mechanism 50. A size of the flexible tube 37 is substantially equal to a size of the screw 200.

FIG. 1 shows the screw locking mechanism 50 including a mounting member 51, and a pneumatic screw driver 53, and a robot arm 90. The robot arm 90 is positioned besides the platform 10. The mounting member 51 is fixed on the robot arm 90. The pneumatic screw driver 53 is mounted on the mounting member 51. The robot arm 90 is configured to move the mounting member 51 and the pneumatic screw driver 53 above a workpiece. The pneumatic screw driver 53 is configured to lock the screw 200 to the workpiece. The pneumatic screw driver 53 includes a driver 531 mounted on the mounting member 51, and a head portion 533 connected to the driver 531 and fixed to the mounting member 51. The head portion 533 defines a screw inlet 535 at a sidewall, and defines an engaging opening 537 at a bottom wall thereof. The engaging opening 537 communicates with the screw inlet 535, and is connected to the flexible tube 37, so that the screws 200 can be conveyed to the engaging opening 537 via the conveying tube 36 and the flexible tube 37. The driver 531 pneumatically drives the screw 200 received in the engaging opening 537 to the workpiece.

The sensor 70 is positioned on the robot arm 90, and is configured to sense the presence of a workpiece and emit a signal to the controller 80 (indicated such presence of the workpiece). The controller 80 is positioned besides the robot arm 90, and is electrically connected to the sensor 70, the pneumatic driver 323, the robot arm 90, and the pneumatic screw driver 53, respectively. The controller 80 receives the signal emitted by the sensor 70, and controls the pneumatic driver 323 to move towards the platform 10 and discharge air from the air outlet 327, and controls the robot arm 90 to move the pneumatic screw driver 53 to the workpiece and the pneumatic screw driver 53 to lock the screw to the workpiece.

In assembly, the base 31 and the feeding mechanism 20 are mounted on opposite ends of the platform 10, respectively, and the feeding opening 21 of the feeding mechanism 20 faces the base 31. The guiding rail 321 is mounted on a sidewall of the mounting plate 311 adjacent to the feeding opening 21. The pneumatic driver 323 is mounted on the sliding member 326, such that the air outlet 327 is located towards the platform 10. The pair of blocking members 33 are positioned on the mounting plate 311 and opposite to each other, and are located below the pneumatic driver 323. The conveying tube 36 is positioned on the fixing block 35, and the through hole 361 is aligned to the air outlet 327. The conveying bridge 34 is positioned on the feeding mechanism 20, and extends to the blocking ends 331. The robot arm 90 is located besides the platform 10. The pneumatic screw driver 53 is mounted on the mounting member 51. The flexible tube 37 connects the conveying tube 36 and the screw inlet 535. The sensor 70 is mounted on the robot arm 90.

In use, the screws 200 are received in the feeding mechanism 20, and the feeding mechanism 20 vibrates to feed the screws 200 to the conveying groove 341 via the feeding opening 21 one by one. When the screws 200 are conveyed by the conveying bridge 34, a screw head of each screw 200 is supported on the conveying bridge 34, and a screw bolt of the each screw 200 is received in the conveying groove 341. The screws 200 move along the conveying bridge 34, thereby having the previous one of the screws 200 being transported to the blocking ends 331 firstly. Thus, the screw 200 is supported by the blocking ends 331 and partially received in the gap between the blocking ends 331. When the sensor 70 senses the presence or proximity of a workpiece, the sensor 70 emits a signal to the controller 80. The controller 80 controls the pneumatic driver 323 to move along the guiding rail 321 towards the platform 10 and discharges air from the air outlet 327. The resisting portions 328 pushes the movable portions 333, thereby moving the movable portions 333 away from each other and releasing the screw 200. The screw 200 drops to the through hole 361, and further passes through the conveying tube 36, the flexible tube 37, the screw inlet 535 and reaches to the engaging opening 537 driven by the air discharged from the air outlet 327. Simultaneously, the pneumatic driver 323 and the blocking members 33 are recovered or returned back to an original state, and the blocking members 33 are configured to be ready to support the next screw 200. The controller 80 controls the robot arm 90 to move the pneumatic screw driver 53 to the workpiece, and then the pneumatic screw driver 53 locks the screw 200 to the workpiece. The screw locking device 100 repeats the above usage actions, and automatically locks the screws 200 one by one. Thus, a huge amount of manual labor and labor costs are reduced.

In an alternative embodiment, the conveying tube 36 can be omitted, and then one end of the flexible tube 37 is directly positioned on the fixing block 35 and aligned to the air outlet 327, while another end of the flexible tube 37 is still connected to the screw inlet 535. The robot arm 90 can be omitted, and the screw locking mechanism 50 can be positioned on the floor or other steady or firm mounting base (not shown), then the workpieces are placed under the pneumatic screw driver 53 when in use. The sensor 70 may be positioned on other places, such as being positioned on the base 31. Alternatively, the sensor 70 can be omitted, and then the workpieces can be conveyed in a constant speed when in use, and the blocking ends 331 release the screws 200 according to the conveying speed of the workpieces. Thus, when the screw locking device 100 starts to operate, the screw locking mechanism 50 locks the screws 200 one by one at regular time intervals. The air outlet 327 can be omitted, and then the screw 200 is gravity fed to the pneumatic screw driver 53.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A screw locking device, comprising:
   a platform;
   a feeding mechanism positioned and mounted on the platform, for receiving a plurality of screws;
   a conveying mechanism comprising:
   a base mounted on the platform,
   a pneumatic driver slidably mounted on the base, and perpendicular to the platform, the pneumatic driver defining an air outlet at an end of the pneumatic driver adjacent to the base,
   a pair of blocking members mounted on the base, and positioned below the pneumatic driver, each of the pair of blocking members comprising a blocking end adjacent to the other one of the pair of blocking members, and the blocking end being positioned below the air outlet, a conveying bridge, an end of the conveying bridge communicating with the feeding mechanism, and an opposite end of the conveying bridge extending to the blocking end, the feeding mechanism configured to feed the plurality of screws to the conveying bridge one by one until reaching to the blocking ends, respectively, and a flexible tube, an end of the flexible tube aligned with the air outlet, and an opposite end of the flexible tube communicating with the pneumatic screw driver;

a robot arm positioned adjacent to the platform;

a sensor positioned on the robot arm, configured to sense a presence of a workpiece and emit a signal;

a pneumatic screw driver positioned on the robot arm; and a controller positioned besides the robot arm, and electronically connected to the robot arm, the pneumatic screw driver, the pneumatic driver, and the sensor, respectively, when the controller receiving the signal emitted by the sensor, the controller controlling the pneumatic driver to move towards the platform and discharge air from the air outlet, so that the pneumatic driver pushing the pair of blocking members to move away from each other, and the screw on the blocking ends dropping to the pneumatic screw driver through the flexible tube driven by the air discharged from the air outlet, and then the controller controlling the robot arm to move the pneumatic screw driver to the workpiece, and controlling the pneumatic screw driver to lock the screw to the workpiece.

2. The screw locking device of claim 1, wherein the feeding mechanism defines a feeding opening, the conveying bridge defines a conveying groove, an end of the conveying bridge away from the feeding mechanism is aligned to the blocking ends, an end of the conveying groove communicates with the feeding opening, and an opposite end of the conveying groove aligned with a gap between the blocking ends.

3. The screw locking device of claim 1, wherein the base comprises a mounting plate substantially perpendicularly positioned on the platform, the pneumatic driver and the pair of blocking members are mounted on the mounting plate.

4. The screw locking device of claim 3, wherein the conveying mechanism further comprises a guiding rail, the guiding rail comprises a guiding member and a sliding member engaged with the guiding member, the guiding member is mounted on the mounting plate, and is substantially perpendicular to the platform, the pneumatic driver is positioned on the sliding member, so that the pneumatic driver is capable of sliding along the guiding member together with the sliding member.

5. The screw locking device of claim 3, wherein the conveying mechanism further comprises a fixing block and a conveying tube, the fixing block is mounted on the mounting plate, the conveying tube is positioned on the fixing block, and defines a through hole, the through hole of the conveying tube is aligned to the air outlet, an end of the flexible tube away from the pneumatic driver communicates with the conveying tube.

6. The screw locking device of claim 1, wherein the pneumatic screw driver defines a screw inlet and an engaging opening communicating with the screw inlet, the screw inlet communicates with the flexible tube.

7. The screw locking device of claim 1, wherein the pneumatic driver comprises a pair of resisting portions corresponding to the pair of blocking members, each of the pair of blocking members comprises a movable portion at a side thereof adjacent to the corresponding one of the pair of resisting portions, when the pneumatic driver moves towards the platform, the pair of resisting portions resists the corresponding movable portions, so that the pair of blocking members moves away from each other.

8. The screw locking device of claim 7, wherein the each of the pair of resisting portions comprises an inclined surface inclined towards the air outlet, each of the movable portions comprises an inclined surface corresponding to the inclined surface of the corresponding resisting portion.

9. The screw locking device of claim 1, wherein the pneumatic driver is a cylinder.

10. The screw locking device of claim 1, wherein the pneumatic screw driver is a cylinder.

11. A screw locking device, comprising:

a platform;

a feeding mechanism positioned and mounted on the platform, for receiving a plurality of screws;

a conveying mechanism comprising:
a base mounted on the platform,
a pneumatic driver slidably mounted on the base, and perpendicular to the platform,
a pair of blocking members mounted on the base, and positioned below the pneumatic driver, each of the pair of blocking members comprising a blocking end adjacent to the other one of the pair of blocking members, and the blocking end being positioned below the pneumatic driver,
a conveying bridge, an end of the conveying bridge communicating with the feeding mechanism, and an opposite end of the conveying bridge extending to the blocking ends, the feeding mechanism configured to feed the plurality of screws to the conveying bridge one by one until reaching to the blocking ends, and
a flexible tube, an end of the flexible tube aligned with a gap between the blocking ends, and an opposite end of the flexible tube communicating with the pneumatic screw driver;

a mounting member;

a pneumatic screw driver positioned on the mounting member; and a controller positioned besides the platform, and electronically connected to the pneumatic screw driver and the pneumatic driver, respectively, the controller is capable of controlling the pneumatic driver to move towards the platform, so that the pneumatic driver pushing the pair of blocking members to move away from each other, and the screw on the blocking ends dropping to the pneumatic screw driver through the flexible tube, and then the controller controlling the pneumatic screw driver to lock the screw to the workpiece.

12. The screw locking device of claim 11, wherein the feeding mechanism defines a feeding opening, the conveying bridge defines a conveying groove, an end of the conveying bridge away from the feeding mechanism is aligned to the blocking ends, an end of the conveying groove communicates with the feeding opening, and an opposite end of the conveying groove aligned with a gap between the blocking ends.

13. The screw locking device of claim 11, wherein the base comprises a mounting plate substantially perpendicularly positioned on the platform, the pneumatic driver and the pair of blocking members are mounted on the mounting plate.

14. The screw locking device of claim 13, wherein the conveying mechanism further comprises a guiding rail, the guiding rail comprises a guiding member and a sliding member engaged with the guiding member, the guiding member is mounted on the mounting plate, and is substantially perpendicular to the platform, the pneumatic driver is positioned on the sliding member, so that the pneumatic driver is capable of sliding along the guiding member together with the sliding member.

15. The screw locking device of claim 13, wherein the conveying mechanism further comprises a fixing block and a conveying tube, the fixing block is mounted on the mounting plate, the conveying tube is positioned on the fixing block, and defines a through hole, the through hole is aligned to the air outlet, an end of the flexible tube away from the pneumatic driver communicates with the conveying tube.

16. The screw locking device of claim 11, wherein the pneumatic screw driver defines a screw inlet and an engaging opening communicating with the screw inlet, the screw inlet communicates with the flexible tube.

17. The screw locking device of claim 11, wherein the pneumatic driver comprises a pair of resisting portions corresponding to the pair of blocking members, each of the pair of blocking members comprises a movable portion at a side thereof adjacent to the corresponding one of the pair of resisting portions, when the pneumatic driver moves towards the platform, the pair of resisting portions resists the corresponding movable portions, so that the pair of blocking members move away from each other.

18. The screw locking device of claim 17, wherein the each of the pair of resisting portions comprises an inclined surface inclined towards the air outlet, each of the movable portions comprises an inclined surface corresponding to the inclined surface of the corresponding resisting portion.

19. The screw locking device of claim 11, wherein the pneumatic driver defines an air outlet aligned to the gap between the blocking ends.

\* \* \* \* \*